United States Patent [19]

Abel et al.

[11] 4,071,468

[45] Jan. 31, 1978

[54] WETTING AND ANTI-FOAMING AGENTS, AND PROCESS FOR REMOVING FOAM FROM AQUEOUS SYSTEMS

[75] Inventors: Heinz Abel; Alfred Berger, both of Reinach, Switzerland

[73] Assignee: Ciba-Geigy Corporation, Ardsley, N.Y.

[21] Appl. No.: 693,584

[22] Filed: June 7, 1976

[30] Foreign Application Priority Data

June 13, 1975 Switzerland .......................... 7695/75
Oct. 7, 1975 Switzerland ......................... 13011/75

[51] Int. Cl.$^2$ ...................... B01D 19/04; B01F 17/02; B01F 17/16; B01F 17/54
[52] U.S. Cl. ......................................... 252/321; 8/86; 8/89 R; 8/92; 106/15 FP; 252/8.1; 252/8.8; 252/353; 252/354; 252/355; 252/356; 252/358
[58] Field of Search .................. 252/321, 358; 8/89 R

[56] References Cited

U.S. PATENT DOCUMENTS

| | | | |
|---|---|---|---|
| 2,147,415 | 2/1939 | Tucker | 252/358 X |
| 2,390,212 | 12/1945 | Fritz | 106/131 |
| 2,575,276 | 11/1951 | Jacoby et al. | 252/321 |
| 2,701,239 | 2/1955 | Ryznar | 252/321 |
| 2,748,086 | 5/1956 | Monson | 252/358 X |
| 2,753,309 | 7/1956 | Figdor | 252/358 |
| 2,849,405 | 8/1958 | Shott et al. | 252/321 X |
| 2,948,757 | 8/1960 | Pruitt et al. | 260/615 |
| 3,198,744 | 8/1965 | Lamont | 252/358 X |
| 3,869,412 | 3/1975 | Waag | 252/89 X |
| 3,925,242 | 12/1975 | Sagi et al. | 252/358 X |

FOREIGN PATENT DOCUMENTS

| | | | |
|---|---|---|---|
| 1,236,478 | 3/1967 | Germany | 260/615 |
| 1,519,967 | 3/1970 | Germany | 252/321 |
| 2,115,082 | 10/1972 | Germany | 252/321 |
| 2,222,996 | 11/1972 | Germany | 252/358 |
| 1,197,776 | 7/1970 | United Kingdom | 252/321 |
| 1,300,030 | 12/1972 | United Kingdom | 252/358 |
| 964,837 | 7/1964 | United Kingdom | 252/358 |
| 967,883 | 8/1964 | United Kingdom | 252/321 |

*Primary Examiner*—Richard D. Lovering
*Attorney, Agent, or Firm*—Edward McC. Roberts; Prabodh I. Almaula

[57] ABSTRACT

Wetting and anti-foaming agents based on anionic surfactants are provided, which contain 1. 2 to 50 percent by weight of an anionic surfactant, 6 to 50 percent by weight of component (2) and optionally (3), said component
2. being a reaction product, which is insoluble or sparingly soluble in water, with a molecular weight of app. 2000 to 7000, of ($a_1$) monohydric to hexahydric alcohols containing 1 to 6 carbon atoms, monoalkyl- or monoalkylolmonoamines or polyalkylenepolyamines, and ($a_2$) 1,2-propylene oxide, and component
3. being a water-insoluble aliphatic monoalcohol of at least 8 carbon atoms, a reaction product of alkylene oxides and a water-insoluble aliphatic monoalcohol containing at least 8 carbon atoms, a reaction product of alkylene oxides and an alkylphenol, a reaction product of a saturated dicarboxylic acid containing 3 to 10 carbon atoms and 1,2-propylene oxide or polypropylene glycols, a reaction product of a fatty acid containing 10 to 18 carbon atoms and 1,2-propylene oxide or polypropylene glycols, a reaction product of a fatty acid containing 10 to 18 carbon atoms, a trihydric to hexahydric alcohol and 1,2-propylene oxide, or a reaction product of a fatty acid containing 10 to 18 carbon atoms, a polyalkylenepolyamine and 1,2-propylene oxide,
4. 0 to 30 percent by weight of silicone oil and
5. 2 to 92 percent by weight of water.

These new agents are useful for preventing foam formation or for removing foam that has formed for example in processes for finishing and dyeing textile materials or for purifying and processing effluents.

32 Claims, No Drawings

WETTING AND ANTI-FOAMING AGENTS, AND PROCESS FOR REMOVING FOAM FROM AQUEOUS SYSTEMS

When carrying out industrial processes for which aqueous or substantially aqueous media are used, there frequently occur troublesome foams which, for example, can retard the speed of the processes and impair the quality of the process products. Typical processes which are affected by these troublesome foams are, for example, processes for manufacturing and finishing paper, processes for finishing and dyeing various substrates, in particular textile materials, processes for manufacturing paints, and also those processes for purifying and processing effluents by mechanical, chemical or biological means, which are carried out in conventional waste water purification plants.

To this end it is known to use antifoams, for example silicone oils, in order to prevent foam formation as far as possible or to remove foam that has formed. The water-insoluble silicone oils have to be converted into aqueous emulsions in order to be able to act as foam inhibitors or antifoams. The stability of these emulsions is unsatisfactory, since the silicones precipitate very rapidly, whereby the desired action is lost, and, in addition, for example in finishing or dyeing processes for textile materials, undesirable effects (staining) can result on the substrates.

The present invention is based on the observation that certain compounds which are water-insoluble or sparingly soluble in water, and which have no wetting action, together with aqueous colloidal solutions of anionic surfactants, yield homogeneous solutions, and can be dissolved, or at least mixed, with water. Compared with the anionic surfactant, these preparations have a markedly improved wetting action (synergism), they also foam very little, have a foam inhibiting effect and have an increased hydrotropy (solubilisation) of other substances which are insoluble or sparingly soluble in water.

The increased hydrotropic action on other substances which are insoluble or sparingly soluble in water is observed, for example, when using silicone oils or other water-insoluble substances in mixtures with the components (1) and (2) and also optionally (3) described hereinafter. The solubilisation of this component mixture is so great that, after addition of the silicone oil, a visually clear, homogeneous mixture is obtained and not, as expected, an emulsion. Such mixtures which contain silicone oils can improve further the wetting action and foam inhibition of the agents of this invention.

The present invention accordingly provides wetting and anti-foaming agents based on anionic surfactants and containing.

1. 2 to 50 percent by weight of an anionic surfactant, 6 to 50 percent by weight of component (2) and optionally (3), said component
2. being a reaction product, which is insoluble or sparingly soluble in water, with a molecular weight of app. 2000 to 7000, of
    a$_1$. monohydric to hexahydric alcohols containing 1 to 6 carbon atoms, monoalkyl- or monoalkylolamines or polyalkylenepolyamines, and
    a$_2$ 1,2-propylene oxide, and component
3. being a water-insoluble aliphatic monoalcohol of at least 8 carbon atoms, a reaction product of alkylene oxides and a water-insoluble aliphatic monoalcohol containing at least 8 carbon atoms, a reaction product of alkylene oxides an an alkylphenol, a reaction product of a saturated dicarboxylic acid containing 3 to 10 carbon atoms and 1,2-propylene oxide or polypropylene glycols, a reaction product of a fatty acid containing 10 to 18 carbon atoms and 1,2-propylene oxide or polypropylene glycols, a reaction product of a fatty acid containing 10 to 18 carbon atoms, a trihydric to hexahydric alcohol and 1,2-propylene oxide, or a reaction product of a fatty acid containing 10 to 18 carbon atoms, a polyalkylenepolyamine and 1,2-propylene oxide, 4. 0 to 30 percent by weight of silicone oil and
5. 2 to 92 percent by weight of water.

Preferred wetting anti-foaming agents of the present invention are those which contain 1. 2 to 50 percent by weight of an anionic surfactant, 6 to 50 percent by weight of component (2) and optionally (3), said component
2. being a reaction product, which is insoluble or sparingly soluble in water, with a molecular weight of 2000 to 7000, of
    a$_1$. monohydric to hexahydric alcohols containing 1 to 6 carbon atoms, monoalkyl- or monoalkylolmonoamines or polyalkylenepolyamines, and
    2$_2$. 1,2-propylene oxide, and component
3. being a water-insoluble aliphatic monoalcohol containing at least 8 carbon atoms or the ethylene oxide reaction product thereof, or being an alkylphenol-alkylene oxide reaction product,
4. 0 to 30 percent by weight of silicone oil, and
5. 20 to 92 percent by weight of water.

A further object of the invention is the use of the agents of the present invention for removing foam from aqueous systems, in particular from dyebaths and finishing baths for textile materials, from paper fibre suspensions which occur in paper manufacture, from paper coating compositions or paints. A preferred utility of the agents of the invention is as low foaming wetting agents and as foam inhibitors in preparations for dyeing and finishing textile materials. A further preferred utility relates to effluent purification processes in the waste water purification plants provided for the purpose.

Anionic surfactants of component (1) are, for example, addition products which contain acid groups of inorganic or organic acids, of ethylene oxide and/or propylene oxide and saturated or unsaturated fatty acids, higher alcohols, alicyclic alcohols and aliphatic-aromatic hydrocarbons.

Thus they can be compounds of the formula

wherein R is an aliphatic hydrocarbon radical of 8 to 22 carbon atoms or a cycloaliphatic or aliphatic-aromatic hydrocarbon radical of 10 to 22 carbon atoms, R$_1$ is hydrogen or methyl, A is —O— or $$-\underset{\underset{O}{\|}}{C}-O,$$

X is the acid radical of an inorganic acid which contains oxygen or the radical of a carboxylic acid and m is an integer from 1 to 20. The radical R—A— is derived, for example, from higher alcohols, such as decyl, lauryl, tridecyl, myristyl, cetyl, stearyl, oleyl, arachidyl or benhenyl alcohol; from hydroabietyl alcohol; from fatty acids, such as caprylic, capric, lauric, myristic, palmitic, stearic, arachidic, behenic acid, coconut fatty acid (8 to 18 carbon atoms), decenoic, dodecenoic, tetradecenoic, hexadecenoic, oleic, linolic, linolenic, eicosenic, docosenic or clupanodonic acid; from alkylphenols, such as butyl-, hexyl-, n-octyl-, n-nonyl-, p-tert. octyl-, p-tert. nonyl-, decyl-, dodecyl-, tetradecyl- or hexadecylphenol. Preferred radicals are those of 10 to 18 carbon atoms, in particular those which are derived from the alkylphenols.

The acid radical X is derived as a rule from low molecular organic monocarboxylic or dicarboxylic acids, for example from chloroacetic acid, acetic acid, maleic acid, malonic acid, succinic acid or sulphosuccinic acid, and is attached to the radical R—A—(CH$_2$CHR$_1$O)—$_m$ through an ether or a ester bridge. In particular, however, X is derived from inorganic polybasic acids, such as ortho-phosphoric acid and sulphuric acid. The acid radical X is preferably in salt form, that is to say, for example, in the form of an alkali metal, ammonium or amine salt. Examples of such salts are sodium, potassium, ammonium, trimethylamine, ethanolamine, diethanolamine or triethanolamine salts. The alkylene oxide units —(CH$_2$CHR$_1$O)— in formula (1) are normally ethylene oxide and 1,2-propylene oxide units, these latter being preferably in admixture with the ethylene oxide units in the compounds of the formula (1).

These compounds are obtained by known methods by reacting the above alcohols, acids and alkylphenols with ethylene oxide or in turn, in optional sequence, with ethylene oxide and 1,2-propylene oxide, and subsequently esterifying the reaction products, and, if appropriate, converting the esters into their salts. Surfactants of component (1) are known, for example, from U.S. Pat. No. 3,211,514.

Preferred surfactants are those of the formula (1) which have the formulae $$R-A-(CH_2CH_2O)\overline{m_1}(CH_2CHO)\overline{m_2}(CH_2CH_2O)\overline{m_3}X \quad (2)$$
$$|$$
$$CH_3$$

and especially $$R-A-(CH_2CH_2O)_n-X \quad (3)$$

wherein R, A and X are as defined hereinbefore, the sum of $m_1$, $m_2$ and $m_3$ is 2 to 20, the ratio of ethylene oxide to propylene oxide groups in compounds of the formula (2) is 1:(1 to 2), preferably 1:1, and n is an integer from 1 to 9, preferably 1 to 5 or 1 to 4.

Particularly preferred surfactants are also those of the formula $$R_2O(CH_2CH_2O)_n-X \quad (4)$$

wherein R$_2$ is a saturated or unsaturated hydrocarbon radical or an alkylphenol of 10 to 18 carbon atoms, and X and n are as previously defined.

Particularly preferred surfactants which are derived from alkylphenyl/ethylene oxide adducts are those of the formulae

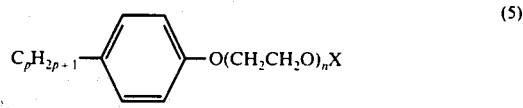

(5)

and

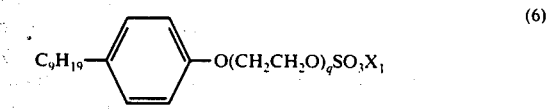

(6)

wherein p is an integer from 4 to 12, q is an integer from 1 to 3 and X$_1$ is hydrogen, NH$_4^+$ or an alkali metal cation, and X and n have the meanings previously assigned to them. If appropriate, mixtures of the above surfactants can also be used.

The surfactants (component (1)) are known wetting and levelling agents (dyeing assistants) which foam strongly when used by themselves.

The reaction products of component (2) are insoluble or sparingly soluble in water and have a molecular weight from app. 2000 to 7000, in particular to about 6000 and preferably from app. 2000 to 4000. The reaction products of component (2) possess no wetting action. They are obtained as a rule by addition of app. 30 to 120 moles of 1,2-propylene oxide to 1 mole of a monohydric or hexahydric alcohol containing 1 to 6 carbon atoms, of a monoalkyl- or monoalkylolmonoamine or of a polyalkenylenepolyamine.

As examples of the monohydric to hexahydric alcohols there may be cited: methyl, ethyl, propyl or butyl alcohol, ethylene glycol, diethylene and triethylene glycol, propylene glycol, dipropylene glycol, propane-1,3-diol, butane-1,2-, -1,4- and -2,3-diol, glycerol, trimethylolethane and trimethylolpropane, hexane-1,2,5- and -1,2,6-triol, 3-hydroxymethylpentane-2,4-diol, pentaerythritol, dipentaerythritol, mannitol or sorbitol.

Preferred alcohols are dihydric to hexahydric alcohols containing 2 to 6 carbon atoms, such as ethylene glycol, propylene glycol, glycerol, pentaerythritol, sorbitol, trimethylolethane and trimethylolpropane.

The monoalkylmonoamines can contain 1 to 18, in particular 1 to 6 and preferably 2 to 4, carbon atoms, and are for example ethyl-, propyl-, octyl-, decyl-, dodecyl-, hexadecyl- or octadecylamine.

The monoalkylomonoamines are as a rule those containing 1 to 6, preferably 2 to 4, carbon atoms, for example ethanol-, propanol-, isopropanol-, or butanolamine.

The polyalkylenepolyamines preferably have the formula $$H_2N(CH_2CH_2NH)_rCH_2CH_2NH_2, \quad (7)$$

wherein r is zero or an integer of 1 to 3.

The majority of the compounds of component (2) are known commercial products. Individually, mention may be made of the adducts of 1,2-propylene oxide and the following alcohols, mono- and polyamines; the preferred average molecular weight is indicated in brackets: ethylene glycol (2000), propylene glycol (2000) and (2700), glycerol (3000), (3100) and (4000), trimethylolpropane (2500), (3200), (4000) and (6300), ethylenediamine (3600), monoisopropanolamine (2300), trimethylolpropane-1,2-propylene oxide-ethylene oxide (3700). As component (3), which can be used, if appropriate, together with component (2) in the agents of the present invention, there are used, for example, water-insoluble monoalcohols, which contain at least 8, preferably 8 to 18 or 9 to 18, carbon atoms. The alcohols can be saturated or unsaturated and branched or unbranched, and they can be used by themselves or in admixture. If components (2) and (3) are used simultaneously in the agents of this invention, their weight ratio can normally be (10 to 2):1.

It is possible to use natural alcohols, for example myristyl alcohol, cetyl alcohol, stearyl alcohol or oleyl alcohol or synthetic alcohols, such as, in particular, 2-ethyl hexanol, and triethyl hexanol, trimethylnonyl alcohol, or the Alfols (registered trademark, Continental Oil Company). The Alfols are linear primary alcohols. The number following the name indicates the average number of carbon atoms which the alcohol contains. For example, Alfol (1218) is a mixture of dodecyl, tetradecyl, hexadecyl and octadecyl alcohol. Other types are Alfol (810), (12), (16) and (18).

The alkylene oxide reaction products of the above water-insoluble monoalcohols, for example the 1,2-propylene oxide reaction products, for example those which contain 1 to 30 moles of 1,2-propylene oxide, in particular, however, the ethylene oxide reaction products of these alcohols, can also be used as component (3). Preferred ethylene oxide reaction products can be illustrated, for example, by the formula $$R_3O(CH_2CH_2O)_sH \tag{8}$$

wherein $R_3$ is a saturated or unsaturated hydrocarbon radical, preferably an alkyl radical, of 8 to 18 carbon atoms, and $s$ is an integer from 1 to 10. If s is an integer from 1 to 3, the products are water-insoluble, whereas the reaction products containing a large number of ethylene oxide units are water-soluble. Examples of these products are the reaction products of, in particular, 2-ethyl hexanol, and also lauryl alcohol, tridecyl alcohol, hexadecyl alcohol and stearyl alcohol and ethylene oxide.

Reaction products of ethylene oxide and/or 1,2-propylene oxide and alkylphenols containing 4 to 12 carbon atoms in the alkyl moiety, which are sparingly soluble in water, are also suitable for use as component (3). Preferably these compounds have the formula

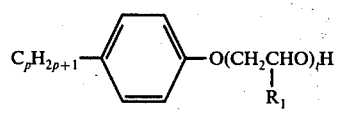

(9)

wherein $R_1$ is hydrogen or methyl, $p$ is an integer from 4 to 12, preferably 8 to 9, and $t$ is an integer from 1 to 60, in particular from 1 to 30 and preferably from 1 to 3.

Specific mention may be made of the following octyl and nonylphenyl reaction products: p-nonylphenol/30 moles of 1,2-propylene oxide; p-octylphenon/2 moles of ethylene oxide; p-nonylphenol/3 moles of ethylene oxide; p-nonylphenol/60 moles of 1,2-propylene oxide.

Reaction products of a saturated dicarboxylic acid containing 3 to 10, in particular 6 to 10, carbon atoms and 1,2-propylene oxide or polypropylene glycols are also suitable for use as component (3). Suitable dicarboxylic acids are, for example, malonic, succinic, glutaric, adipic, pimelic, suberic, azelaic or sebacic acid. Adipic and sebacic acid are preferred. The number of 1,2-propylene oxide units in the reaction products can be about 2 to 40. Finally, it is also possible to use reaction products of fatty acids containing 10 to 18 carbon atoms and 1,2-propylene oxide or polypropylene glycols. The fatty acids can be saturated or unsaturated, for example capric, lauric, myristic, palmitic or stearic acid, or decenoic, dodecenoic, tetradecenoic, hexadecenoic, oleic, linolic, linolenic, or ricinolic acid. The number of 1,2-propylene oxide units in these esters can be approximately as high as in the above mentioned reaction products.

Further reaction products which are suitable as component (3) are obtained from the above fatty acids containing 10 to 18 carbon atoms, trihydric to hexahydric alcohols or polyalkylenepolyamines and 1,2-propylene oxide.

The trihydric to hexahydric alcohols contain preferably 3 to 6 carbon atoms and are in particular glycerol, trimethylolpropane, pentaerythritol and sorbitol. The polyalkylenepolyamines can be illustrated by the formula (7)

Mention may be made, for example, of the reaction product of lauryl sorbitol and 1,2-propylene oxide (molecular weight 2500) and the reaction product of the polyaminoamide of the formula $$C_{11}H_{23}CONHCH_2CH_2NHCH_2CH_2NHCH_2CH_2NH_2$$

(lauric acid/triethylenetetramine) and 1,2-propylene oxide (molecular weight 2600).

All compounds and reaction products referred to herein as being suitable for use as component (3) are either known, to a partial extent obtainable commercially, or they can be obtained by methods which are familiar to the skilled person.

The silicone oils of component (4) are used in the processes of this invention particularly whenever a markedly foam inhibiting action is sought. The silicone oils, however, can also further improve the wetting action of the agents employed. The silicone oils can be used in amounts of up to 30 percent by weight, for example 1 to 30, especially up to 20 and, if appropriate, also only up to 10, percent by weight, referred to the agent. By silicone oils are meant organopolysiloxanes (optionally terminally blocked with hydroxyl), for example polydimethyl siloxanes, polymethylphenylsiloxanes and polymethylhydrogen siloxanes with average molecular weights of app. 1000 to 100000, preferably 5000 to 40000. In particular alkylpolysiloxanes with a viscosity of at least 0.7 centipoise at 25° C are suitable. The alkyl moiety can contain 1 to 6 carbon atoms. Preferred silicone oils are, for example, the methylsiloxanes which have a viscosity of 50 to 15.000, preferably from app. 100 to 1000, centipoise at 25° C. Suitable methylsiloxanes can be illustrated by the formula

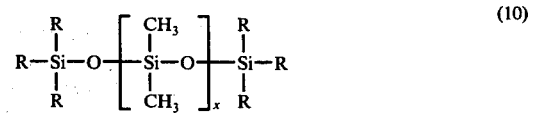

(10)

wherein R represents methyl or methoxy and x is an integer greater than 1, for example an integer having a value of 50 to 1200 or greater. These are customary and known commercial products, which in addition to containing the silicone oil, may also contain customary additives such as for example colloidal silicic acid or emulsifiers on the base of polyethylene glycols. Examples of such silicone oils are silicone oil SAG 100 (Union Carbide), silicone oil DB 100 and MSA (Dow Corning) and silicone oil SH (Wacker Chemie). The silicone oils of higher molecular weight are preferred. They are used preferably in relatively small amounts in order, for example, to avoid characteristic effects of the silicone oils (such as hydrophoby).

The wetting and anti-foaming agents used in the present invention can be obtained by simply stirring the cited components, at temperatures of 15° to 80° C, in particular at temperatures of 15° to 30° C, in water as component (5), in the form of homogeneous, preferably clear, mixtures, which are very stable when stored at room temperature. In particular, the agents contain
 10 to 50 percent by weight of component (1),
 10 to 50 percent by weight of component (2) and optionally (3),
 0 to 30 percent by weight of component (4) and
 2 to 80 percent by weight of water.
Particularly suitable agents are also those which contain 10 to 20 percent by weight of component (1), 15 to 35 percent by weight of component (2) and optionally (3), 0 to 10 percent by weight of component (4), and 40 to 75 percent by weight of water.

Depending on the amount and nature of the components used, the wetting and anti-foaming agents are slightly to highly viscous in the indicated aqueous form. They can be mixed with water to yield immediately clear, homogeneous preparations. The wetting and anti-foaming agents can be used in acid or alkaline preparations (pH range about 1 to 12) and in a wide temperature range, for example 20° to 120° C, without losing their action. For application in practice they can be used undiluted or after dilution with water, an amount of app. 0.001 to 20 g/l of the agents being sufficient. Application baths for treating textiles can contain app. 0.1 to 10 g/l, in particular 0.5 to 5 g/l. Agents which contain silicone oils and therefore are used particularly for inhibiting or preventing foam, for example in effluent purification, are generally used in amounts of 0.001 to 1 g/l, preferably of 0.001 to 0.1 g/l. The amount used depends also on the surfactants present in the effluent or the other aqueous systems.

The wetting and anti-foaming agents can, if appropriate, also be obtained without component (5) (water). Concentrated preparations with a total solids content of app. 25 to 75% are obtained. These concentrates can contain component (1) in an amount of 25 to 70 percent by weight, component (2) and optionally (3) in an amount of 25 to 70 percent by weight, and component (4) in an amount of 0 to 30 percent by weight.

The wetting and anti-foaming agents can be used in a very wide variety of processes in which aqueous preparations are used which tend to foam readily, for example:

a. dyeing wool with 1:1 or 1:2 methyl complex dyes, acid or reactive dyes; exhaustion or continuous dyeing processes for dyeing synthetic polyamide fibres with acid dyes or disperse dyes; dyeing polyester fibres with disperse dyes; dyeing cellulosic fibres with reactive and direct exhausting dyes; dyeing polyacrylonitrile fibres with cationic dyes;

b. finishing processes for textile materials; shrinkproofing wood or fibre blends containing wool; flameproofing and creaseproofing cellulosic material; providing different fibrous substrates with an oil, water and dirt repellent finish; providing different fibrous substrates with an antistatic finish and a soft handle; treating different fibrous substrates with fluorescent brighteners;

c. paper manufacture (paper fibre suspensions) and paper finishing, in particular sizing paper with aqueous resin preparations or treating the surface of paper (paper coating compositions);

d. removing the foam from effluents. In addition to the impurities they carry along or which are dissolved in them, communal or industrial effluents usually also have the disadvantage that they foam strongly. This foaming can hinder the processing in waste water purification plants and complicate the introduction of air into biological purification plants. It is therefore advantageous to add foam inhibiting agents to such effluents. In order to manage with very small amounts of such foam inhibitors on the one hand, and on the other, not to reduce the efficiency of the purification plant, the foam inhibitor must be very stable and as far as possible inert. The wetting and anti-foaming agents described herein fulfill these conditions in an exceptional manner:

e. as foam inhibiting additive to washes in domestic washing machines, f. for obtaining non-foaming paint preparations.

The agents of this invention can additionally have a levelling effect in the above processes, especially in dyeing and finishing processes.

A good foam inhibition is obtained when other readily foaming assistants (surfactants) are used simultaneously. Another effect of these agents, which also is reflected in the levelness of the dyeings and finishes, resides in their capacity to deaerate aqueous systems almost completely, i.e. to prevent air pockets in the application baths and on or in the substrates. This deaeration substantially eliminates, for example, the formation of stains on coloured substrates.

On account of their good hydrotropic properties, the wetting and anti-foaming agents are particularly suitable in the application of substances which are insoluble or sparingly soluble in water (dyes, finishing agents), since these can be brought into a finely dispersed form without additional and possibly large amounts of solvent being necessary. The finishing processes can thus be carried out very much more cheaply.

In the following Examples the parts and percentages are by weight. The following reaction products and compounds are examples of components (1) to (3).

Anionic surfactants [component (1)]:

$A_1$ — ammonium salt of the acid sulphuric acid ester of the adduct of 2 moles of ethylene oxide and 1 mole of p-tert. nonylphenol;

$A_2$ — ammonium salt of the acid sulphuric acid ester of the adduct of 3 moles of ethylene oxide and 1 mole of tridecyl alcohol;

$A_3$ — sodium salt of the acid maleic acid ester of the adduct of 2 moles of ethylene oxide and 1 mole of p-nonylphenol;

$A_4$ — ammonium salt of the acid sulphuric acid ester of the adduct of 3 moles of ethylene oxide and 1 mole of p-butylphenol;

$A_5$ — ammonium salt of the acid phosphoric acid ester of the adduct of 2 moles of ethylene oxide and 1 mole of p-nonylphenol;

$A_6$ — sodium salt of the acetate of the adduct of 4 moles of ethylene oxide and 1 mole of p-octylphenol;

$A_7$ — sodium salt of the disulphosuccinic acid ester of the adduct of 4 moles of ethylene oxide and 1 mole of p-octylphenol;

$A_8$ — ammonium salt of the acid sulphuric acid ester of coconut fatty acid diglycol;

$A_9$ — ammonium salt of the acid sulphuric acid ester of the adduct of 1 mole of ethylene oxide and 1 mole of stearyl alcohol;

$A_{10}$ — ammonium salt of the acid sulphuric acid ester of the adduct of 9 moles of ethylene oxide and 1 mole of p-nonylphenol;

$A_{11}$ — ammonium salt of the acid sulphuric acid ester of the adduct of 6 moles of ethylene oxide and 1 mole of p-nonylphenol;

$A_{12}$ — sodium salt of the monosulphosuccinic acid ester of the adduct of 2 moles of ethylene oxide and 1 mole of p-nonylphenol;

$A_{13}$ — ammonium salt of the acid sulphuric acid ester of the adduct of 1 mole of propylene oxide and 1 mole of ethylene oxide and 1 mole of nonylphenol;

$A_{14}$ — ammonium salt of the acid sulphuric acid ester of the adduct of 10 moles of propylene oxide and 10 moles of ethylene oxide and 1 mole of nonylphenol;

$A_{15}$ — ammonium salt of the acid sulphuric acid ester of the adduct of 6 moles of ethylene oxide and 1 mole of dodecylphenol;

$A_{16}$ — ammonium salt of the acid sulphuric acid ester of the adduct of 6 moles of ethylene oxide and 1 mole of pentadecylphenol;

$A_{17}$ — ammonium salt of the acid sulphuric acid ester of the adduct of 5 moles of ethylene oxide and 1 mole of tributylphenol;

$A_{18}$ — ammonium salt of the acid sulphuric acid ester of the adduct of 3 moles of ethylene oxide and 1 mole of Alfol (2022);

$A_{19}$ — ammonium salt of the acid sulphuric acid ester of the adduct of 2 moles of ethylene oxide and 1 mole of hydroabietyl alcohol;

$A_{20}$ — ammonium salt of the acid sulphuric acid ester of the adduct of 2 moles of ethylene oxide and 1 mole of octylphenol.

Component (2):

$B_1$ — reaction product of ethylene glycol and 1,2-propylene oxide, molecular weight 2000

$B_2$ — reaction product of propylene glycol and 1,2-propylene oxide, molecular weight 2000

$B_3$ — reaction product of propylene glycol and 1,2-propylene oxide, molecular weight 2700

$B_4$ — reaction product of glycerol and 1,2-propylene oxide, molecular weight 3000

$B_5$ — reaction product of glycerol and 1,2-propylene oxide, molecular weight 3100

$B_6$ — reaction product of glycerol and 1,2-propylene oxide molecular weight 4000

$B_7$ — reaction product of trimethylolpropane and 1,2-propylene oxide, molecular weight 2500

$B_8$ — reaction product of trimethylolpropane and 1,2-propylene oxide, molecular weight 3200

$B_9$ — reaction product of trimethylolpropane and 1,2-propylene oxide, molecular weight 4000

$B_{10}$ — reaction product of trimethylolpropane and 1,2-propylene oxide, molecular weight 6300

$B_{11}$ — reaction product of ethylenediamine and 1,2-propylene oxide, molecular weight 3600

$B_{12}$ — reaction product of monoisopropanolamine and 1,2-propylene oxide, molecular weight 2300

$B_{13}$ — reaction product of methanol (or 1-methoxy-2-propanol) and 1,2-propylene oxide, molecular weight 2750

$B_{14}$ — reaction product of butanol and 1,2-propylene oxide, molecular weight 3000

$B_{15}$ — reaction product of sorbitol and 1,2-propylene oxide, molecular weight 2650

$B_{16}$ — reaction product of pentaerythritol and 1,2-propylene oxide, molecular weight 3000

$B_{17}$ — reaction product of methylethanolamine and 1,2-propylene oxide, molecular weight 3000

$B_{18}$ — reaction product of hexylamine and 1,2-propylene oxide, molecular weight 3000

$B_{19}$ — reaction product of triethanolamine and 1,2-propylene oxide, molecular weight 3650

$B_{20}$ — reaction product of triethylenetetramine and 1,2-propylene oxide, molecular weight 3050

$B_{21}$ — reaction product of dipropylenetriamine and 1,2-propylene oxide, molecular weight 3500

Component (3):

$C_1$ — 2-ethylhexanol;

$C_2$ — Alfol (1218)

$C_3$ — trimethylhexanol;

$C_4$ — reaction product of 30 moles of propylene oxide and 1 mole of nonylphenol;

$C_5$ — reaction product of 3 moles of ethylene oxide and 1 mole of nonylphenol;

$C_6$ — reaction product of 2 moles of ethylene oxide and 1 mole of nonylphenol;

$C_7$ — reaction product of 1 mole of ethylene oxide and 1 mole of stearyl alcohol;

$C_8$ — reaction product of 3 moles of ethylene oxide and 1 mole of stearyl alcohol;

$C_9$ — reaction product of 1 mole of ethylene oxide and 1 mole of butylphenol;

$C_{10}$ — reaction product of 10 moles of propylene oxide and 1 mole of dodecylphenol;

$C_{11}$ — reaction product of 5 moles of ethylene oxide and 1 mole of 2-ethylhexanol;

$C_{12}$ — reaction product of 8 moles of ethylene oxide and 1 mole of o-phenylphenol;

$C_{13}$ — reaction product of 3 moles of ethylene oxide and 1 mole of tridecyl alcohol;

$C_{14}$ — reaction product of 3 moles of ethylene oxide and 1 mole of hexadecyl alcohol;

$C_{15}$ — reaction product of 2 moles of ethylene oxide and 1 mole of lauryl alcohol;

$C_{16}$ — reaction product of 10 moles of ethylene oxide and 1 mole of 2-ethylhexanol;

$C_{17}$ — reaction product of 1,2-propylene oxide and 1 mole of oleyl alcohol (molecular weight 2000);

$C_{18}$ — reaction product of 60 moles of 1,2-propylene oxide and 1 mole of p-nonylphenol (molecular weight 3700);

$C_{19}$ — reaction product of 1 mole of polypropylene glycol (molecular weight 2000) and 1 mole of oleic acid;

$C_{20}$ — reaction product of 2 moles of polypropylene glycol (molecular weight 1000) and 1 mole of adipic acid;

$C_{21}$ — reaction product of 1,2-propylene oxide and 1 mole of laurylsorbitan ester (molecular weight 2500);

$C_{22}$ — reaction product of 1,2-propylene oxide and 1 mole of a polyaminoamide of the formula $C_{11}H_{23}CONHCH_2CH_2NHCH_2CH_2NHCH_2CH_2NH_2$ (molecular weight 2600).

EXAMPLE 1

To 70 parts of a 40% preparation of surfactant $A_1$ are added, with stirring, 50 parts of component $B_7$.

A clear, colourless, readily pourable preparation is obtained, which can be used as low foaming wetting and deaerating agent and as solubilising agent for dyes in various dyeing processes, for example in exhaustion, slop padding or padding processes.

The foam formation and foam inhibition is determined by means of a foam test, wherein dilute aqueous preparations of the described agents are prepared, shaken for 1 minute, and the height of the foam in mm is then measured 1 and 5 minutes respectively after the shaking is terminated.

|  | foam height in mm | |
|---|---|---|
|  | after 1 minute | after 5 minutes |
| comparison surfactant (1 g/l) (adduct of p-tert. octylphenol and 8 moles of ethylene oxide) | 210 | 200 |
| preparation of Example 1 (1 g/l) | 80 | 20 |

Instead of surfactant $A_1$ it is also possible to use the following surfactants: $A_2$, $A_3$, $A_4$, $A_5$, $A_6$, $A_{12}$.

Compounds $B_2$, $B_3$, $B_4$, $B_9$, $B_{10}$, $B_{11}$, $B_{13}$ and optionally $C_1$, $C_2$, $C_3$ or $C_4$ can be used instead of compound $B_7$.

In all cases, low foaming preparations which can be used with equally good results for the indicated purpose are also obtained.

EXAMPLE 2

To 70 parts of a 40% aqueous preparation of surfactant $A_6$, which has been heated to 70° C, are added 30 parts of reaction product $B_5$ (70° C). Then 1 part of silicone oil and 49 parts of water (70° C) are added and the mixture is allowed to cool, with stirring, to room temperature.

A clear, slightly yellowish, non-foaming preparation is obtained, which can be used as wetting and deaerating agent in dyeing processes. A good foam inhibiting effect is simultaneously obtained, if, for example, additional surfactants are used.

The following results are obtained in the foam test of Example 1.

|  | Foam height | |
|---|---|---|
|  | after 1 min. | after 5 min. |
| comparison surfactant (1 g/l) (sulphonated reaction product of o-phenylenediamine, stearic acid and benzyl chloride) | 205 | 205 |
| comparison surfactant (1 g/l) + preparation of Example 2 (1 g/l) | 50 | 20 |
| preparation of Example 2 (1 g/l) | 0 | 0 |

The following components can also be used to obtain preparations with comparable properties:
Component (1) : $A_1$, $A_5$, $A_8$, $A_{10}$, $A_{11}$;
Component (2) : $B_1$, $B_2$, $B_3$, $B_7$, $B_9$, $B_{11}$, $B_{12}$ and optionally $C_5$.

EXAMPLE 3

With stirring, 30 parts of reaction product $B_8$, which has been warmed to 70° C, are added to 70 parts of a 40% aqueous preparation of surfactant $A_1$, which has been warmed to 70° C. Thereafter 10 parts of silicone oil are added and the mixture is stirred for 1 hour at 70° C. Then 27 parts of water of 70° C are added and stirring is continued until the mixture has cooled to room temperature.

A stable preparation is obtained of a foam inhibitor with very good foam inhibiting action, when, for example, further surfactants are simultaneously used. The following results are obtained in the foam test of Example 1:

|  | Foam height in mm | |
|---|---|---|
|  | after 1 min. | after 5 min. |
| surfactant $A_1$ (1 g/l) | 220 | 190 |
| surfactant $A_1$ + reaction product $B_8$ (1 g/l) | 80 | 20 |
| comparison surfactant A (0.5 g/l) (adduct of oleylamine and 8 moles of ethylene oxide) | 140 | 135 |
| comparison surfactant A (0.5 g/l) + preparation of Example 3 (0.2 g/l) | 10 | 2 |
| comparison surfactant B (0.5 g/l) (adduct of coconut fatty alcohol and 6 moles of etylene oxide) | 190 | 180 |
| comparison surfactant B (0.5 g/l) + preparation of Example 3 (0.5 g/l). | 70 | 3 |
| comparison surfactant C (1 g/l) (sulphonated reaction product of o-phenylenediamine, stearic acid and benzyl chloride) | 205 | 207 |
| comparison surfactant C (1 g/l) + preparation of Example 3 (0.3 g/l) | 55 | 40 |

The wetting capacity is also measured: (A piece of cotton fabric is immersed in a test liquid and is first given buoyancy on account of the air which is trapped in the fabric The penetration of the liquid expels the air from the fabric and the fabric begins to sink. The time is measured from the moment of penetration to that when the fabric begins to sink).

|  | immersion time in seconds |
|---|---|
| surfactant $A_1$ (1 g/l) | 42 |
| reaction product $B_8$ (1 g/l) | no wetting action |
| surfactant $A_1$ + reaction product $B_8$ (1 g/l) | 27 |

In addition to this positive synergistic effect on the wetting action, the mixture of surfactant $A_1$ and reaction product $B_8$ foams much less than surfactant $A_1$ alone.

Foam inhibitors with comparably good action are also obtained by using the following components:
component (1) : $A_2$, $A_6$, $A_8$, $A_9$, $A_{12}$
component (2) : $B_2$, $B_3$, $B_5$, $B_6$, $B_7$, $B_8$, $B_9$, $B_{12}$.

EXAMPLE 4 a. With stirring, 30 parts of reaction product $B_3$ are added to 30 parts of a 40% aqueous preparation of surfactant $A_1$ at room temperature. Then 6 parts of compound $C_1$ and 1 part of silicone oil are added and the mixture is diluted with 33 parts of water while stirring constantly.

b. 25 parts of reaction product $B_3$ are mixed with 5 parts of compound $C_6$, 6 parts of compound $C_1$ and 1 part of silicone oil. To this mixture are added, with constant stirring, 30 parts of a 40% preparation of surfactant $A_1$ and the mixture is subsequently diluted with 33 parts of water.

In both (a) and (b) a non-foaming wetting and anti-foaming agent is obtained, which can be used in dyeing and finishing processes.

| Foam test: | Foam height in mm | |
|---|---|---|
|  | after 1 min. | after 5 min. |
| comparison surfactant (1 g/l) (sulphonated reaction product of o-phenylenediamine, stearic acid and benzyl chloride) | 205 | 205 |
| comparison surfactant (1 g/l) + preparation of Example 4a) (1 g/l) | 60 | 20 |
| comparison surfactant (1 g/l) + preparation of Example 4b) (1 g/l) | 50 | 20 |
| preparation of Example 4a) (1 g/l) | 0 | 0 |
| preparation of Example 4b) (1 g/l) | 0 | 0 |

EXAMPLE 5

In a glass beaker, 24 parts of reaction product $B_{17}$ are homogeneously mixed at room temperature with 0.8 part of silicone oil by stirring. After the temperature has been raised to 60° C, 22 parts of surfactant $A_1$ and thereafter 53.2 parts of water are added. Stirring is continued until the mixture has cooled to room temperature. A low foaming wetting agent is obtained, which can be used both in padding liquors and in liquors for the exhaustion process.

Similar results are obtained by using reaction products $B_{13}$ or $B_{18}$ instead of reaction product $B_{17}$.

EXAMPLE 6

In a mixing vessel with anchor agitator, 0.6 part of silicone oil and 19 parts of reaction product of $B_{19}$ are homogeneously mixed and thereafter 46 parts of surfactant $A_{15}$ are added. After stirring for 60 minutes, 34.4 parts of water of 40° C are slowly added and stirring is continued for 3 minutes. A stable product in paste form, which can be used as low foaming wetting agent, is obtained. Similar results are obtained by using reaction product $B_{20}$.

EXAMPLE 7

32 parts of surfactant $A_{17}$ and 16 parts of reaction product $B_{21}$ are mixed together at 60° C. Thereafter 3 parts of silicone oil are added and the mixture is stirred until homogeneous. Then 49 parts of water of 70° C are added and stirring is continued until the mixture has cooled to room temperature. A non-foaming wetting agent is obtained.

EXAMPLE 8 a. 16 parts of reaction product $B_3$ and 16 parts of reaction product $B_{17}$ are mixed in an agitator vessel at room temperature and the mixture is then warmed to 80° C. Then 1.3 parts of silicone oil and subsequently the two components, 14 parts of surfactant $A_1$ and 52.7 parts of water, which have been warmed to 50° C, are stirred in. Stirring is then continued until the mixture has cooled to room temperature. A preparation which can be used as non-foaming wetting agent is obtained. Similar results are obtained by replacing reaction product $B_{17}$ with reaction product $B_{15}$ or also with a preparation obtained from the following components:

b. 32 parts of reaction product $B_3$, 14 parts of surfactant $A_1$, 0.3 part of silicone oil and 53.7 parts of water.

EXAMPLE 9

40 parts of surfactant $A_{20}$, 33 parts of reaction product $B_{17}$ and 53 parts of water are homogeneously mixed in a stirring vessel.

A low foaming wetting agent which is particularly suitable for carpet continuous dyeing is obtained.

EXAMPLE 10

20 parts of reaction product $B_3$ and 14 parts of silicone oil are homogeneously mixed at room temperature. Then 47 parts of surfactant $A_1$ (40% aqueous preparation) are slowly stirred in and finally 19 parts of water are added.

A foam inhibitor of universal application, for example also for removing foam from effluents, is obtained. Foam text of Example 1:

| Product | g/l | Foam height in mm | |
|---|---|---|---|
|  |  | after 1 min. | after 5 min. |
| comparison surfactant (sulphonated reaction product of o-phenylene-diamine, stearic acid and benzyl chloride) | 1 | 205 | 205 |
| comparision surfactant + preparation of Example 5 | 1 | 18 | 3 |
| preparation of Example 5 | 1 | 0 | 0 |
| comparison surfactant + preparation of Example 6 | 1 | 67 | 14 |
| preparation of Example 6 | 2 | 20 | 0 |
| comparison surfactant + preparation of Example 7 | 1 | 0 | 0 |
| preparation of Example 7 | 0.5 | 0 | 0 |
| comparison surfactant + preparation of Example 8a | 1 | | |
| preparation of Example 8a | 3 | 24 | 0 |
| preparation of Example 8a | 3 | 0 | 0 |
| comparison surfactant + preparation of Example 8b | 1 | | |
| preparation of Example 8b | 3 | 24 | 0 |
| preparation of Example 8b | 3 | 0 | 0 |
| comparison surfactant + preparation of Example 10 | 1 | 0 | 0 |
| preparation of Example 10 | 0.05 | 0 | 0 |

EXAMPLE 11

100 kg of cheeses (wool) with a goods carrier are charged into a circulation dyeing machine. In the preparing vessel, 1200 liters of water are heated to 60° C and 1200 g of the preparation of Example 2 are dissolved therein. The liquor is then pumped from the preparing vessel through the material into the dyeing apparatus and subsequently circulated alternately. The addition of the preparation results in a spontaneous deaeration of the dyeing system and consequently in a good penetration of the goods. This can be ascertained from the fact that, inter alia, the apparatus can be filled with approximately 10% more water. Dyeing can subsequently be performed with, for example, the reactive dye of the formula

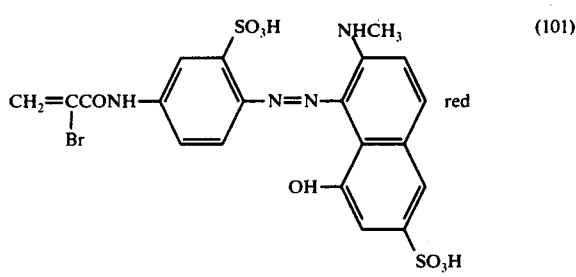

for 1 hour at the boiling temperature of the liquor (96°–100° C). As further dyeing assistant the liquor contains 1 kg of a 1:1 mixture of the quaternised adduct of 7 moles of a $C_{16}$–$C_{18}$ fatty amine mixture (quaternising agent: chloroacetamide) and of the ammonium salt of the acid sulphuric acid ester of the adduct of 7 moles of ethylene oxide and 1 mole of a $C_{16}$–$C_{18}$ fatty amine mixture (50% aqueous preparation). Virtually no foaming occurs during the dyeing. The previously mentioned good deaeration ensures an increased velocity of flow. Troublesome air pockets and the formation of foam flecks on the goods are thus prevented.

A strong, level penetration dyeing of the cheeses is obtained.

EXAMPLE 12

On a wench beck, 100 kg of cotton knit goods are wetted in 3000 liters of water initially with the addition of 3 kg of the preparation of Example 2. Within 30 seconds the cotton is completely wetted and deaerated and therefore no longer tends to float during dyeing. The goods are then dyed for 2 hours at the boiling temperature (96°–100° C) of the bath in the same liquor to which 2 kg of a dye of the formula

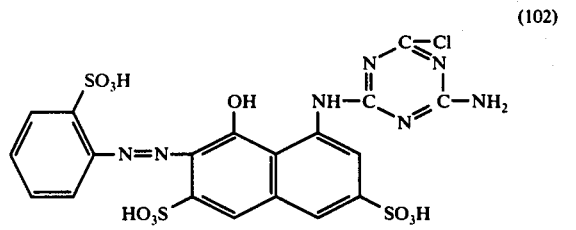

as well as the customary chemicals, such as electrolytes and alkaline compounds, have been added. Although a foaming levelling agent is used simultaneously, the foam is so inhibited that the goods remain beneath the surface of the bath during dyeing, except when being transported on the winch.

A level, stainless, red dyeing with penetration of the dye is obtained on the cotton knit goods.

EXAMPLE 13

100 kg of cotton flock are packed into a packing apparatus. To the warm liquor of 60° C (2000 liters of water) are added 2 kg of the preparation of Example 1. The cotton is wetted through and deaerated in a short time on account of the strong wetting and deaerating action and can be dyed, for example, as described in Example 12. The foam formation is markedly reduced. A level penetration dyeing of the cotton flock is obtained. If the adduct of 8 moles of ethylene oxide and 1 mole of p-tert. octylphenol is used as comparison product, a satisfactory wetting is obtained, but the dearation is insufficient and the foam formation hinders the dyeing process.

The deaeration can be illustrated in the following way:

10 g of wool tops are put into cylindrical glass containers, which are open on one side, measure 24 cm in length and have an internal diameter of 2.8 cm, and compressed. Then 80 $cm^3$ of water which contains 0.08 g of the comparison surfactant or of the preparation of Example 1 are poured into each of the cylinders. The deaeration is more pronounced in the cylinder with the lower level of liquor.

EXAMPLE 14

To a strongly foaming effluent mixture of communal and industrial provenance is added from a preparing vessel, which contains a 1% solution of the preparation of Example 10b, 1 ml of this solution per liter of effluent. The foam is thereby removed and no fresh formation of foam occurs. The temperature and the pH of the effluent are of no account for the effectiveness of the solution used.

EXAMPLE 15 unbleached cotton gabardine is slop padded with a liquor which contains, per liter
  20 g of the dye C.I. Vat Brown 33
  10 g of the preparation of Example 8b
  20 g of a 10% aqueous preparation of 1 part of polyvinylpyrrolidone and 3 parts of methylvinyl ether/maleic anhydride copolymer
  2 g of an alginate thickener.
The fabric is squeezed out to a pick-up of 80% and dried for 2 minutes at 120° C. The fabric is again padded with an aqueous liquor which contains, per liter
  50 ml of a 30% sodium hydroxide solution
  35 g of sodium hydrosulphite
  15 g of sodium sulphate crystallized and squeezed out to a pick-up of 90%. The fabric is thereafter steamed for 30 seconds with saturated steam at 103° C. The treated goods are then oxidised in the conventional manner, rinsed, deacidified, rinsed once more, soaped at the boil and then dried.

The addition of the preparation of Example 8a effects an excellent and level deep penetration dyeing of the fabric. The fastness properties of the dyed fabric are not adversely affected.

EXAMPLE 16

Unbleached cotton fabric is slop padded with an aqueous liquor which contains per liter
  7 ml of sodium tetrasilicate (water glass) (80%)
  22 ml of hydrogen peroxide (35%)
  20 g of sodium hydroxide
  2 g of the sodium salt (dihydrate) of ethylenediaminetetraacetic acid
  1 g of the preparation of Example 8b.
The fabric is squeezed out to a pick-up of 80% and then stored for 15 hours at 25° C.
Without first being dried, the fabric is then again slop padded with an aqueous liquor which contains, per liter, 12 ml of hydrogen peroxide (35%) and squeezed out to a pick-up of 38%. The fabric is then steamed for 60 seconds in a high temperature steamer at 130° C and subsequently washed off in a 100 plus unit machine at 130° C.

The addition of the preparation of Example 6 results in the goods in the liquor being well wetted without the liquor foaming.

EXAMPLE 17

100 kg of a polyester fibre fabric are dyed in a high temperature jet dyeing machine in the following way: The dyebath of 100 liters of water is warmed to 60° C and then the following ingredients are added:
5 g/l of the preparation of Example 8b
2.5 g/l of coconut fatty acid diethanolamide (17%)
0.5 g/l of acetic acid
1500 g of the dye of the formula

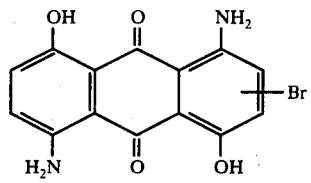 (103)

The fabric is put into the bath, which is heated to 125° C in the course of 40 minutes. Dyeing is carried out for 40 minutes at this temperature and subsequently rinsed. The addition of the preparation of Example 8b causes the goods to run perfectly on account of the good foam inhibition. If the procedure is carried out without this preparation, the run of the goods is poor on account of the foam formation and the levelness of the dyed material is consequently unsatisfactory.

EXAMPLE 18

A knitted fabric made of synthetic polyamide fibres (nylon 66) is provided with an anti-static finish with the following preparation:
16 g/l of the diepoxide of polyethylene glycol (molecular weight 300)
3 g/l of triethylenetetramide
5 g/l of the preparation of Example 2
976 g/l of water
1000 g of padding liquor.

The liquor pick-up is 70%. After the fabric has been padded, it is cured for 30 seconds at 180° C. After conditioning has been effected in a climatic chamber of 22° C and 45% relative humidity for 24 hours, the surface resistance was measured with a Hewlett Packard high resistance meter. The following values were obtained:

| Material | Surface resistance (ohms) | Surface resistance after 1 wash at 40° C |
|---|---|---|
| untreated | $2.10^{13}$ | $2.10^{13}$ |
| treated | $1,5.10^{9}$ | $2.10^{10}$ |

EXAMPLE 19

Overalls fabric (twilled cotton) is provided with a flameproof finish with the following preparation:
280 g/l of 3-dimethylphosphono-propionic acid-N-methylolamide (80%)
80 g/l of hexamethylolmelaminedimethyl ether
20 g/l of hexamethylolmelaminemethyl ether/stearic acid alkylolamide reaction product
40 g/l of 2-amino-2-methyl-propanol-1
5 g/l of water
1000 g of padding liquor The liquor pick-up is 80%. The fabric is dried after it has been padded and then fixed for 4½ minutes at 160° C. A washing-off is subsequently effected for 5 minutes at 95° C with 4 g/l of sodium carbonate and 1 g/l of a reaction product of 1 mole of p-tert. nonylphenol and 9 moles of ethylene oxide An improved penetration of the material is achieved by using the preparation of Example 5 in the padding passage. Moreover, the padding liquor remains free of foam. The flameproofing effects were evaluated according to DIN 53 906 (vertical test, ignition time 6 seconds):

| Material | Char length in cm | After-burning time in seconds |
|---|---|---|
| untreated twilled cotton | burns through | — |
| finished twilled cotton | 12 | 0 |

We claim:
1. Wetting and anti-foaming agents based on anionic surfactants which contain
   1. 2 to 50 percent by weight of an anionic surfactant of the formula

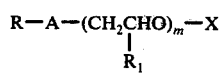

wherein
   R is an aliphatic hydrocarbon radical of 8 to 22 carbon atoms or a cycloaliphatic or aliphatic-aromatic hydrocarbon radical of 10 to 22 carbon atoms,
   $R_1$ is hydrogen or methyl,
   A is —O— or

X is the acid radical of an inorganic acid which contains oxygen or the radical of a carboxylic acid, and the alkali metal, ammonium or amine salts thereof, and
   m is an integer from 1 to 20; 6 to 50 percent by weight of components (2) and (3), said component
   2. being a reaction product, which is insoluble or sparingly soluble in water, with a molecular weight of approximately 2000 to 7000, of
      $a_1$. monohydric to hexahydric alcohols containing 1 to 6 carbon atoms, monoalkyl- or monoalkylolmonoamines or polyalkylenepolyamines, and
      $a_2$. 1,2-propylene oxide, and component
   3. being a water-insoluble aliphatic monoalcohol of at least 8 carbon atoms,
      a reaction product of alkylene oxides and a water-insoluble aliphatic monoalcohol containing at least 8 carbon atoms,
      a reaction product of alkylene oxides and an alkylphenol,
      a reaction product of a saturated dicarboxylic acid containing 3 to 10 carbon atoms and 1,2-propylene oxide or polypropylene glycols, a reaction product of a fatty acid containing 10 to 18 carbon atoms and 1,2-propylene oxide or polypropylene glycols, a reaction product of a fatty acid containing 10 to 18 carbon atoms, a trihydric to hexahydric alcohol and 1,2-propylene oxide, or a reaction product of a fatty acid containing 10 to 18 carbon atoms, a polyalkylenepolyamine and 1,2-propylene oxide, and wherein the weight ratio of component (2) to component (3) is (10 to 2):1, 4. 0 to 30 percent by weight of an organopolysiloxane silicone oil which is optionally blocked with hydroxyl, and 5. 2 to 92 percent by weight of water.

2. An agent according to claim 1, which contains 1. 2 to 50 percent by weight of the anionic surfactant, 6 to 50 percent by weight of components (2) and (3), component 2. being a reaction product, which is insoluble or sparingly soluble in water, with a molecular weight of 2000 to 7000, of ($a_1$) monohydric to hexahydric alcohols containing 1 to 6 carbon atoms, monoalkyl- or monoalkylolmonoamines or polyalkylenepolyamines, and ($a_2$) 1,2-propylene oxide, and component 3. being a water-insoluble aliphatic monoalcohol containing at least 8 carbon atoms or the ethylene oxide reaction product thereof, or being an alkylphenol-alkylene oxide product, 4. 0 to 30 percent by weight of silicone oil, and 5. 20 to 92 percent by weight of water.

3. An agent according to claim 1, which contains 10 to 50 percent by weight of component (1),
10 to 50 percent by weight of components (2) and (3),
0 to 30 percent by weight of component (4) and
20 to 80 percent by weight of water.

4. An agent according to claim 3, which contains 10 to 20 percent by weight of component (1),
15 to 35 percent by weight of components (2) and (3),
0 to 10 percent by weight of component (4) and
40 to 75 percent by weight of water.

5. An agent according to claim 3, which contains 10 to 20 percent by weight of component (1),
15 to 35 percent by weight of component (2) and (3),
0.1 to 2 percent by weight of component (4), and
40 to 75 percent by weight of water.

6. An agent according to claim 1, wherein component (1) is a compound of the formula $$R-A-(CH_2CH_2O)_n-X$$

wherein R, A and X are as defined in claim 1 and $n$ is an integer from 1 to 9.

7. An agent according to claim 6, wherein component (1) is a compound of the formula $$R_2O-(CH_2CH_2O)_n-X$$

wherein $R_2$ is a saturated or unsaturated hydrocarbon radical or alkylphenol of 10 to 18 carbon atoms, and X and $n$ are as defined in claim 6.

8. An agent according to claim 6, wherein component (1) is a compound of the formula

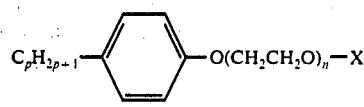

wherein $p$ is an integer from 4 to 12 and $n$ and X are as defined in claim 6.

9. An agent according to claim 8, wherein component (1) is a compound of the formula

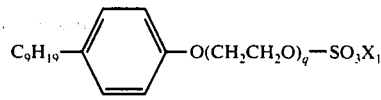

wherein $q$ is an integer from 1 to 3 and $X_1$ is hydrogen, $NH_4$ or an alkali metal cation.

10. An agent according to claim 6 wherein $n$ is an integer from 1 to 4.

11. An agent according to claim 1, wherein component (1) is a compound of the formula

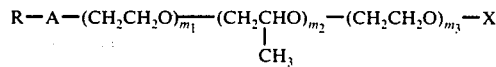

wherein R, A and X are as defined in claim 1, the sum of $m_1$, $m_2$ and $m_3$ is 2 to 20, and the ratio of ethylene oxide to propylene oxide units is 1: (1 to 2).

12. An agent according to claim 1, wherein the compounds of component (1) are in the form of alkali metal, ammonium or amine salts.

13. An agent according to claim 1, wherein component (2) is a reaction product of ethylene glycol, propylene glycol, glycerol, pentaerythritol, sorbitol, trimethylolethane or trimethylolpropane and 1,2-propylene oxide.

14. An agent according to claim 1, wherein component (2) is a reaction product of monoalkyl- or monoalkylolmonoamines containing 1 to 6 carbon atoms or polyalkylenepolyamines of the formula $$H_2N(CH_2CH_2NH)_rCH_2CH_2NH_2$$

wherein $r$ is 0 or an integer from 1 to 3, and 1,2-propylene oxide.

15. An agent according to claim 14, wherein component (2) is a reaction product of monoisopropanolamine or ethylenediamine and 1,2-propylene oxide.

16. An agent according to claim 1, wherein component (3) is an aliphatic saturated or unsaturated, branched or straight-chain monoalcohol containing 8 to 18 carbon atoms or a mixture of such alcohols.

17. An agent according to claim 1, wherein component (3) is a reaction product of ethylene oxide and/or 1,2-propylene oxide and aliphatic saturated or unsaturated, branched or straight-chain monoalcohols containing 8 to 18 carbon atoms.

18. An agent according to claim 17, wherein component (3) is a compound of the formula $$R_3O(CH_2CH_2O)_sH$$

wherein $R_3$ is a saturated or unsaturated hydrocarbon radical of 8 to 18 carbon atoms and $s$ is an integer from 1 to 10.

19. An agent according to claim 17, wherein component (3) is a compound of the formula $$R_3O(CH_2CH_2O)_sH$$

wherein $R_3$ is a saturated or unsaturated hydrocarbon radical of 8 to 18 carbon atoms and s is an integer from 1 to 3.

20. An agent according to claim 1, wherein component (3) is a reaction product of ethylene oxide and/or 1,2-propylene oxide and alkylphenols containing 4 to 12 carbon atoms in the alkyl moiety.

21. An agent according to claim 20, wherein component (3) is a compund of the formula

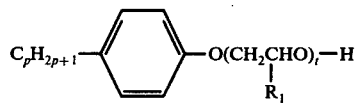

wherein $R_1$ is hydrogen or methyl, p is an integer from 4 to 12 and t is an integer from 1 to 60.

22. An agent according to claim 21, wherein t is an integer from 1 to 30.

23. An agent according to claim 1, wherein component (3) is a reaction product of a saturated dicarboxylic acid containing 3 to 10 carbon atoms and 1,2-propylene oxide or polypropylene glycols.

24. An agent according to claim 23, wherein component (3) is a reaction product of adipic acid or sebacic acid and 1,2-propylene oxide or polypropylene glycols.

25. An agent according to claim 1, wherein component (3) is a reaction product of a fatty acid containing 10 to 18 carbon atoms and 1,2-propylene oxide

26. An agent according to claim 1, wherein component (3) is a reaction product of a fatty acid containing 10 to 18 carbon atoms, a trihydric to hexahydric alcohol containing 3 to 6 carbon atoms and 1,2-propylene oxide.

27. An agent according to claim 1, wherein component (3) is a reaction product of a fatty acid containing 10 to 18 carbon atoms, a polyalkylenepolyamine of the formula $$H_2N-(CH_2CH_2NH)_n-CH_2CH_2NH_2$$

wherein $n$ is 0 or 1, 2 or 3, and 1,2-propylene oxide.

28. An agent according to claim 1, wherein component (4) is an alkylpolysiloxane with a viscosity of at least 0.7 centipoise at 25° C.

29. Wetting and anti-foaming agents based on anionic surfactants which contain 1. 2 to 50 percent by weight of an anionic surfactant of the formula $$R-A-(CH_2CHO)_m-X$$
$$\phantom{R-A-(CH_2C}|$$
$$\phantom{R-A-(CH_2CHO)_m}R_1$$

wherein
R is an aliphatic hydrocarbon radical of 8 to 22 carbon atoms or a cycloaliphatic or aliphatic-aromatic hydrocarbon radical of 10 to 22 carbon atoms,
$R_2$ is hydrogen or methyl,
A is —O— or

X is the acid radical of an inorganic acid which contains oxygen or the radical of a carboxylic acid, and the alkali metal, ammonium or amine salts thereof, and
m is an integer from 1 to 20; 6 to 50 percent by weight of components (2) and (3), said component 2. being a reaction product, which is insoluble or sparingly soluble in water, with a molecular weight of approximately 2000 to 7000, of
   $a_1$. monohydric to hexahydric alcohols containing 1 to 6 carbon atoms, monoalkyl- or monoalkylol-monoamines or polyalkylenepolyamines, and
   $a_2$. 1,2-propylene oxide, and component 3. being a reaction product of 8 moles of ethylene oxide and 1 mole of o-phenylphenol and wherein the weight ratio of component (2) to component (3) is (10 to 2):1, 4. 0 to 30 percent by weight of an organopolysiloxane silicone oil which is optionally blocked with hydroxyl, and 5. 2 to 92 percent by weight of water.

30. A process for removing foam from aqueous systems which comprises incorporating into the aqueous system 0.001 to 20 grams per liter of a wetting and antifoaming agent which contains 1. 2 to 50 percent by weight of an anionic surfactant of the formula $$R-A-(CH_2CHO)_m-X$$
$$\phantom{R-A-(CH_2C}|$$
$$\phantom{R-A-(CH_2CHO)_m}R_1$$

wherein
R is an aliphatic hydrocarbon radical of 8 to 22 carbon atoms or a cycloaliphatic or aliphatic-aromatic hydrocarbon radical of 10 to 22 carbon atoms,
$R_1$ is hydrogen or methyl,
A is —O— or

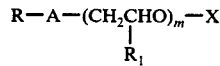

X is the acid radical of an inorganic acid which contains oxygen or the radical of a carboxylic acid, and the alkali metal, ammonium or amine salts thereof, and
m is an integer from 1 to 20; 6 to 50 percent by weight of components (2) and (3), said component 2. being a reaction product, which is insoluble or sparingly soluble in water, with a molecular weight of approximately 2000 to 7000, of
   $a_1$. monohydric to hexahydric alcohols containing 1 to 6 carbon atoms, monoalkyl- or monoalkylolamines or polyalkylenepolyamines, and
   $a_2$. 1,2-propylene oxide, and component 3. being a water-insoluble aliphatic monoalcohol of at least 8 carbon atoms, a reaction product of alkylene oxides and a water-insoluble aliphatic monoalcohol containing at least 8 carbon atoms, a reaction product of alkylene oxides and an alkylphenol, a reaction product of a saturated dicarboxylic acid containing 3 to 10 carbon atoms and 1,2-propylene oxide or polypropylene glycols, a reaction product of a fatty acid containing 10 to 18 carbon atoms and 1,2-propylene oxide or polypropylene glycols, a reaction product of a fatty acid containing 10 to 18 carbon atoms, a trihydric to hexahydric alcohol and 1,2-propylene oxide, or a reaction product of a fatty acid containing 10 to 18 carbon atoms, a polyalkylenepolyamine and 1,2-propylene oxide, and wherein the weight ratio of component (2) to component (3) is (10 to 2):1, 4. 0 to 30 percent by weight of an organopolysiloxane silicone oil which is optionally blocked with hydroxyl, and 5. 2 to 92 percent by weight of water.

31. A process according to claim 30, wherein the aqueous system is a dyeing or finishing bath for treating textile materials, and the amount of said agent incorporated therein is 0.1 to 10 grams per liter.

32. A process according to claim 30, wherein the aqueous system is an effluent and the amount of said agent incorporated therein is 0.001 to 1 gram per liter.

* * * * *